United States Patent [19]
Beranek et al.

[11] Patent Number: 5,857,049
[45] Date of Patent: Jan. 5, 1999

[54] PRECISION ALIGNMENT OF OPTOELECTRONIC DEVICES

[75] Inventors: Mark W. Beranek, Bellevue, Wash.; George E. Charles, Chandler; Barbara M. Foley, Pheonix, both of Ariz.; Peter F. Lilienthal, II, Princeton; Muhammed A. Shahid, Ewing Township, both of N.J.

[73] Assignees: Lucent Technologies, Inc.,, Murray Hill, N.J.; Motorola, Inc.,, Schaumburg, Ill.; The Boeing Company, Seattle, Wash.

[21] Appl. No.: 850,984

[22] Filed: May 5, 1997

[51] Int. Cl.[6] .................................................. G02B 6/36
[52] U.S. Cl. .............................. 385/91; 385/88
[58] Field of Search ................... 385/88–94, 91

[56] References Cited

U.S. PATENT DOCUMENTS

| | | | |
|---|---|---|---|
| 5,179,609 | 1/1993 | Blonder et al. | 385/89 |
| 5,210,811 | 5/1993 | Avelange et al. | 385/91 |
| 5,231,686 | 7/1993 | Rabinovich | 385/93 |
| 5,257,336 | 10/1993 | Dautartas | 385/93 |
| 5,259,054 | 11/1993 | Benzoni et al. | 385/89 |
| 5,276,754 | 1/1994 | Blair et al. | 385/88 |
| 5,309,537 | 5/1994 | Chun et al. | 385/59 |
| 5,345,524 | 9/1994 | Lebby et al. | 385/88 |
| 5,383,118 | 1/1995 | Nguyen | 385/32 X |
| 5,420,954 | 5/1995 | Swirhun et al. | 385/92 |
| 5,432,878 | 7/1995 | Smous | 385/52 |

*Primary Examiner*—Phan T. H. Palmer
*Attorney, Agent, or Firm*—Morgan & Finnegan, L.L.P.

[57] ABSTRACT

An optoelectronic module is disclosed in which an optoelectronic device is precisely aligned with an optical fiber. The optoelectronic module comprises a first member, a second member for supporting an end of the optical fiber in a fixed position relative the first member along an axis, and a third member for mounting at least one optoelectronic device. A plurality of positioning members are adjustably positioned on the first member for supporting the third member to maintain aligned relation of the optoelectronic device with the axis.

48 Claims, 10 Drawing Sheets

PRECISION ALIGNMENT OF OPTOELECTRONIC DEVICES

BACKGROUND OF THE INVENTION

1. Field of the Invention

The present invention relates generally to the field of optoelectronics and, more particularly, to an improved method and device for providing precise optical alignment between an optoelectronic device and an optical fiber.

2. Description of the Related Art

Optoelectronics (or photonics) is a rapidly expanding technology that plays an increasingly important role in many aspects of modern society (e.g., communication over optical fibers, computer storage and display, etc.). With the increasing number of actual and potential commercial applications for optoelectronic systems, there is a need to develop cost effective and precise manufacturing techniques for assembling optoelectronic modules (e.g., fiber-optic cable repeaters and transmitters).

One of the problems associated with developing such cost effective manufacturing techniques is the criticality that the components (e.g., lasers, photodiodes and optical fibers) of such optoelectronic modules be assembled with high precision to assure proper optical coupling and durability. Typically, an optoelectronic module includes a package or housing containing an optoelectronic device (e.g., semiconductor laser, LED or photodiode) coupled to an optical fiber (e.g., single mode, multimode or polarization maintaining) that extends from the package. A major challenge in assembling such optoelectronic modules is in maintaining optimal alignment of the optoelectronic device with the optical fiber to maximize the optical radiation (e.g., light) transmitted through the optical fiber. In order to obtain maximum optical coupling, it is typically desired that the core-center of the optical fiber be precisely aligned with that of the optoelectronic device. In some cases, such as with a single-mode optical fiber, the alignment between the optoelectronic device (i.e, laser) and optical fiber must be within tolerances of 1 µm or less.

A conventional method for aligning an optoelectronic laser with an optical fiber is known as "active alignment", where the laser is bonded to a substrate and one end of a desired type of optical fiber is positioned in close proximity to a light-emitting surface of the laser in order to transmit light emitted from the laser through the optical fiber. A photodetector, such as a large area photodetector, is positioned at the opposing end of the fiber to collect and detect the amount of light (optical radiation) coupled to and transmitted through the fiber. The position of the fiber is incrementally adjusted relative to the laser either manually or using a machine until the light transmitted through the fiber reaches a maximum, at which time, the optical fiber is permanently bonded to the same substrate that the laser was previously bonded to.

An optoelectronic photodiode, such as a PIN or APD photodiode, may similarly be coupled to an optical fiber through "active alignment" by bonding the photodiode to a substrate and positioning the end of the optical fiber that is to be coupled to the photodiode in proximity to the light-receiving surface of the photodiode. Light is then radiated through the opposing end of the optical fiber using a light source and the position of the fiber is incrementally adjusted relative the photodiode until the photodiode's electrical response reaches a maximum, wherein the optical fiber is then bonded to the substrate supporting the photodiode.

Alternatively, such "active alignment" of an optoelectronic device (e.g., laser or photodiode) to an optical fiber has been attempted by initially bonding the optical fiber to the substrate, moving the optoelectronic device into alignment by detecting the maximum optical radiation through the fiber, and then bonding the aligned optoelectronic device to the substrate supporting the fiber.

It is readily apparent that conventional active alignment techniques are inherently time consuming and require significant expertise and experience. Thus, with the increased demand for greater volumes of mass-produced optoelectronic modules, such time consuming assembly techniques become increasingly detrimental, thereby contributing to the relatively high manufacturing costs associated with conventional optoelectronic modules.

Indeed, contemporary assembly of conventional or hybrid microelectronic packages using conventional "pick-and-place" tools and surface mounting techniques have proven inefficient and insufficient for repeatedly mass producing optoelectronic modules. A number of micrometer-precision manufacturing tools and processes have also been developed for manufacturing optoelectronic modules, each having their own unique set of trade-offs for ease of use, cost, yield, extent of automation, upgradeabililty, flexibility, repeatability, accuracy, resolution, precision and propensity for bond liability after fixing. Such automated optoelectronic assembly equipment are typically high in cost due to the fact that they are usually custom or semi-custom built, large in size and weight, limited in part feeding ability and inadequate in resolution to perform single mode fiber alignment which requires alignment and bonding processes within tolerances of 1 µm or less. As such, the optoelectronics industry has been required to rely heavily on labor-intensive manual assembly techniques for manufacturing high-performance optoelectronic modules.

Another problem associated with developing cost-effective techniques for assembling optoelectronic modules at the required high level of precision is achieving dimensional stability during bonding of the optoelectronic device and optical fiber to the substrate. Conventional bonding processes, such as laser welding and epoxy bonding, frequently result in residual stresses in the bonds that may cause undesirable creep and misalignment between the components of the optoelectronic module.

Solder alloys are widely used in the optoelectronics industry for bonding optoelectronic devices to submounts inside optoelectronic package housings. Some of the more common submount materials include aluminum nitride, beryllium oxide, beryllium-copper alloy, copper, copper-tungsten alloy, diamond, molybdenum and silicon. Because most optoelectronic devices are made from Group III–V (e.g., GaAs, InP, etc.) and their ternary and quaternary alloys (e.g., GaInAs, GaInAsP, GaInAsP, etc.), the submount materials upon which the optoelectronic devices are bonded generally have dissimilar mechanical and thermal properties. In environments where temperature cycling is expected (e.g., commercial aerospace platforms and outdoor fiber-optic cable systems), high thermal stresses and creep strains may build up in the solder joints, potentially leading to premature joint failure and shortened operating life.

During conventional optoelectronic device die-bonding processes, solder is heated to approximately 300° C. to melt it, enabling the solder to wet the submount and optoelectronic device metalization layers. When cooled, the solder re-solidifies to form a metallurgical bond between the device and submount. It is known that a die-bonded optoelectronic device-to-submount assembled in this manner is mechanically and electrically robust and reliable if the coefficients of thermal expansion (CTE) are matched to within a few parts-per-million per degree Celsius, and if proper metallurgy is selected at the solder joint interfaces. Upon thermal cycling, however, both the magnitude and spatial relationship of some thermal stress/strain components in the solder joint change, which, in some cases, causes premature failure in the device or induce undesirable mechanical movement between the device and submount. Today, die-bonding accuracies achieved by conventional die bonding methods are in the 50 μm range due to the lack of special machine vision and/or active alignment die-bonding process technology.

More recently, a new optoelectronic device bonding technique known as "self-alignment" based upon solder bump flip-chip technology has been employed to reduce die bonding accuracies from tens of micrometers toward a few micrometers. In this "self-alignment" process, small (approximately 75 μm diameter) solder bumps are placed around the periphery of the optoelectronic device. These solder bumps serve to "self-align" the device (i.e., through surface tension) as the solder is heated to a molten state and during reflow of the solder. When coupling light between optical fibers or waveguides and optoelectronic devices, the self-alignment process eliminates the need for actively adjusting the position of the device relative the fiber or waveguide when the solder is molten. This self-alignment process, however, has only been successfully used to assemble optoelectronic modules where the optomechanical tolerances are fairly loose (e.g., approximately 10 μm) and has not yet been shown to be production-worthy in single mode optoelectronic circuits where a few micrometer bonding accuracy is considered too coarse, leaving the highly labor-intensive and time-consuming active alignment method as the only production-worthy alternative.

SUMMARY OF THE INVENTION

The foregoing and other objects and advantages are achieved in accordance with the present invention through the provision of an optoelctronic module in which one or more optoelectronic devices are precisely aligned with one or more optical fibers. The optoelectronic module in accordance with the present invention comprises a first member, a second member for supporting an end of the optical fiber in a fixed position relative the first member along an axis, a third member for mounting at least one optoelectronic device, and a plurality of positioning members positioned on the first member for supporting the third member to maintain aligned relation of the optoelectronic device with the axis.

In accordance with the present invention, a method is also provided for aligning one or more optoelectronic devices to one or more optical fibers. The method comprises the steps of positioning an end of the optical fiber in a fixed position relative to a top surface of a first member and mounting the optoelectronic device on a top surface of a second member. A plurality of positioning members are positioned on the top surface of the first member for supporting the third member. The optoelectronic device is energized and light passing through the optical fiber is detected. One or more of the positioning members are incrementally adjusted until the light detected through the optical fiber is maximized.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DETAILED DESCRIPTION

The present invention is applicable to a wide variety of optoelectronic modules where an optoelectronic device (e.g., semiconductor laser, LED, photodiode or a waveguide) is coupled to one or more optical fibers. It is understood that the invention is not intended to be limited to a particular type of optoelectronic device and may be utilized, for instance, to allow for coupling of a laser (e.g., edge-emitting laser or vertical cavity surface emitting laser (VCSEL)) or laser array to an optical fiber or fiber array, respectively. Yet another example is where an optical waveguide, single or array, is to be coupled with another similar device, fiber(s) or optoelectronic device. As another example, the optoelectronic device may be a photodiode or photodiode array coupled to an optical fiber or fiber array, respectively. In addition, the optical fiber or fiber array may be single mode, multimode or polarization maintaining.

Figure 1:
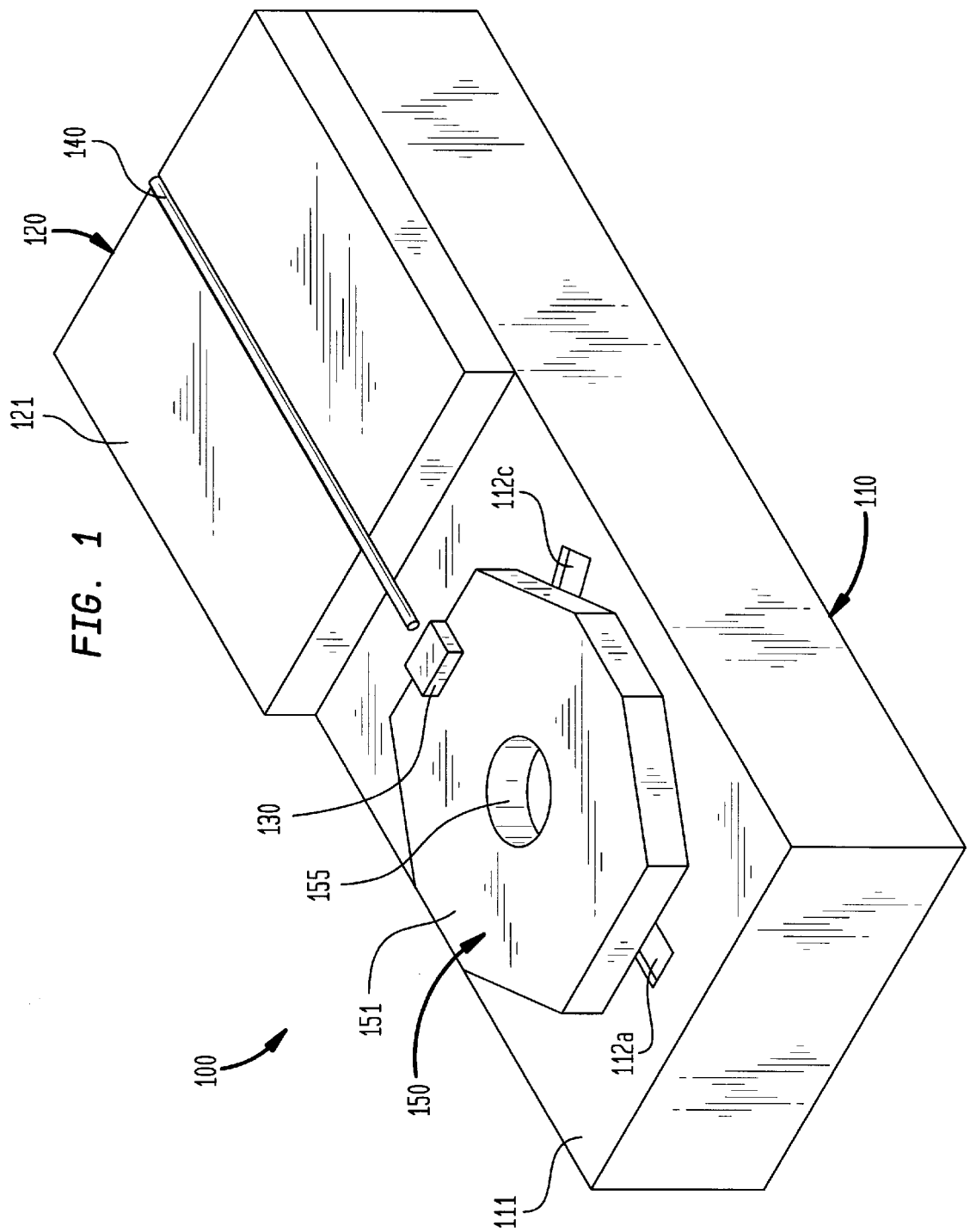
FIG. 1 is an enlarged perspective view illustrating an embodiment of an optoelectronic module in accordance with the present invention.

FIG. 1 illustrates an enlarged simplified perspective view of an embodiment of an optoelectronic module 100 in accordance with the present invention. Optoelectronic module 100 comprises a first member or substrate 110 for supporting (either directly or indirectly) an optoelectronic device 130 and an optical fiber 140. The substrate 110 preferably has a top surface 111, which surface is substantially flat and planar. The substrate 110 is preferably made from silicon, but may also be made from GaAs or from any other suitable material.

Figure 2:
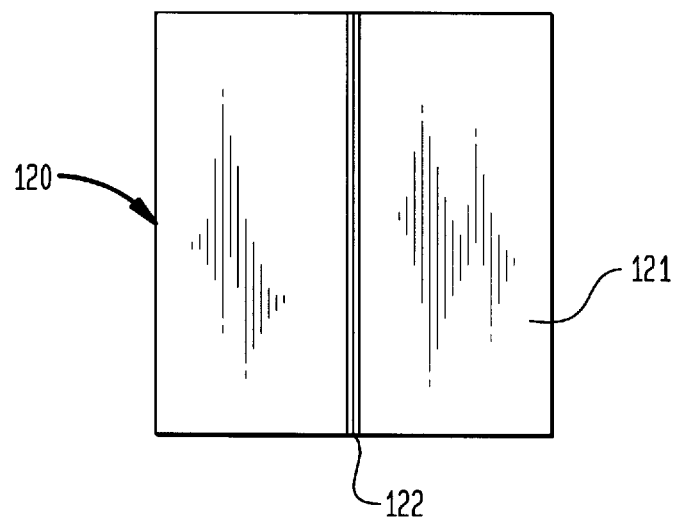
FIG. 2 is a top plan view of the base for supporting an optical fiber in accordance with the present invention.
Figure 3:
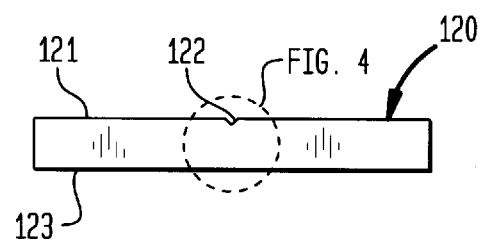
FIG. 3 is a front elevation view of the base shown in FIG. 2 illustrating a groove in which the optical fiber is seated.
Figure 4:
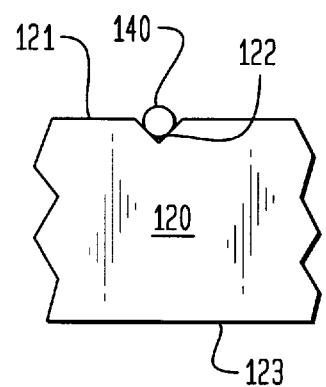
FIG. 4 is an enlarged view of the groove formed in the base shown in FIG. 3.

The optoelectronic module 100 also comprises a second member or base 120 for supporting an optical fiber 140 within a groove 122 formed in the base 120. Preferably, as is illustrated in FIGS. 2–4, the base 120 includes an upper surface 121 and a lower surface 123, both surfaces being substantially flat and planar. The base 120 is supported by and extends upwardly from a portion of the top surface 111 of the substrate 110 so that the upper surface 121 of the base 120 is elevated above the top surface 111 of the substrate 110. The base 120 is preferably made from the same material as the substrate 110 (e.g., silicon or GaAs) and may either be integrally formed as part of the substrate 110 or as a separate element that is joined to the substrate 110 in a conventional manner (e.g., bonded, fastened, etc.). A high temperature ceramic adhesive is a preferred adhesive for bonding the base 120 to the substrate 110 due, in part, to its ability to withstand temperatures above 200° C.—the temperature required to reflow a solder preform to bond a header 150 to the substrate 110.

With reference to FIGS. 1–4, the upper surface 121 of the base 120 includes a longitudinally extending groove 122 for locating and supporting the optical fiber 140. The groove 122 is preferably of a generally V-shaped or U-shaped configuration and is of sufficient dimension to precisely locate and support the optical fiber 140. Preferably, the V-shaped groove 122 may be formed in the base 120 photomasking and selectively, anisotropically by etching the groove within the base material. Alternatively, by photomasking and selectively, isotropically etching the base 120, a U-shaped groove 122 of correct dimensions can also be formed. Once positioned within the groove 122 of base 120, the optical fiber 140 is bonded within the groove of the base 120 using any suitable adhesive (e.g., high temperature ceramic adhesive) that is capable of bonding to the base material and that will withstand temperatures above 200° C.—the temperature required to reflow the solder preform used to bond the header 150 to the substrate 110. Alternatively, if the fiber 140 is metalized, the fiber 140 may be joined to the base 140 by soldering or welding the metalized fiber 140 to the groove 122.

The optoelectronic module 100 also comprises a third member or header 150 for supporting the optoelectronic device 130 (e.g., semiconductor laser, LED or photodiode). The header 150 preferably includes an upper surface 151 and a lower surface 152, each of which is substantially flat and planar.

Figure 5:
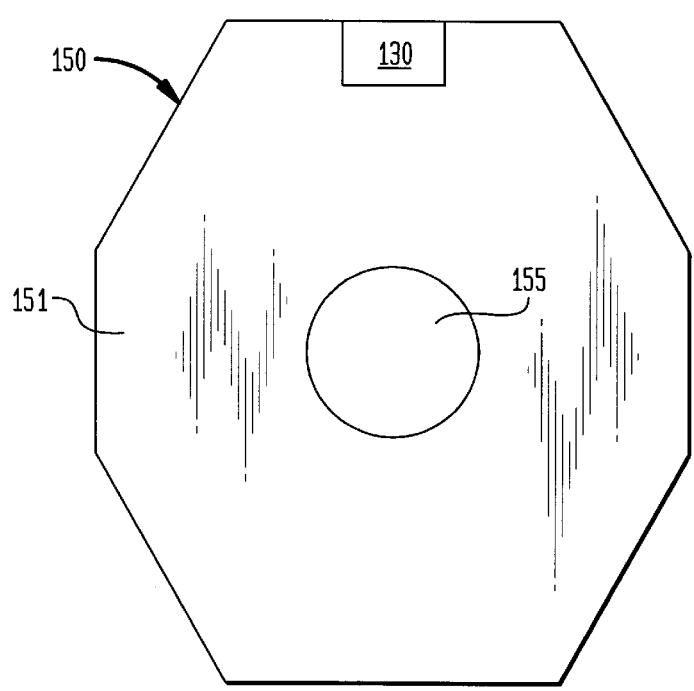
FIG. 5 is a top plan view of the header for supporting the optoelectronic device.
Figure 6:
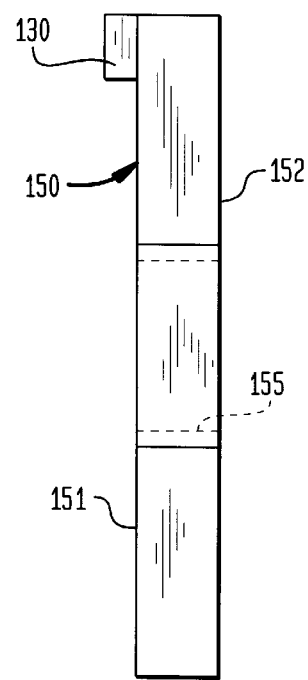
FIG. 6 is a side elevational view of the header illustrated in FIG. 5.

Referring to FIGS. 1, 5 and 6, the header 150 is also indirectly supported by and extends upwardly from a second portion of the top surface 111 of the substrate 110 so that the upper surface 151 of the header 150 is elevated above the top surface 111 of the substrate 110. The optoelectronic device 130 is located on and supported by the upper surface 151 of the header 150 in a position in close proximity to an end of the optical fiber 140 supported by the base 120. A metalization layer, such as Ti:Pt:Au, may be applied to the upper surface 151 of the header 150 to facilitate bonding and electrically connecting the optoelectronic device 130 to the header 150. The optoelectronic device 130 may be bonded to the header 150 in a conventional manner (e.g., soldering) and electrical connections to the optoelectronic device 130 may also be made in a conventional manner (e.g., solder and wire bonding). In addition to the optoelectronic device 130, other electronic devices may also be positioned on the header 150 (e.g., thermo-electric cooler, light detector, etc.).

The header 150 is preferably made from silicon or any other suitable material. It is recommended that the substrate 110, base 120 and header 150 be made from the same material, preferably silicon.

Figure 9:
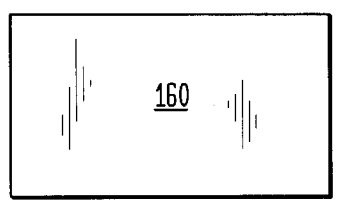
FIG. 9 is a top plan view of an exemplary positioning member in accordance with the present invention.
Figure 10:
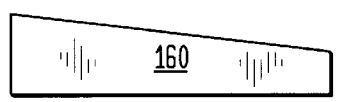
FIG. 10 is a side elevational view of the positioning member illustrated in FIG. 9.
Figure 11:
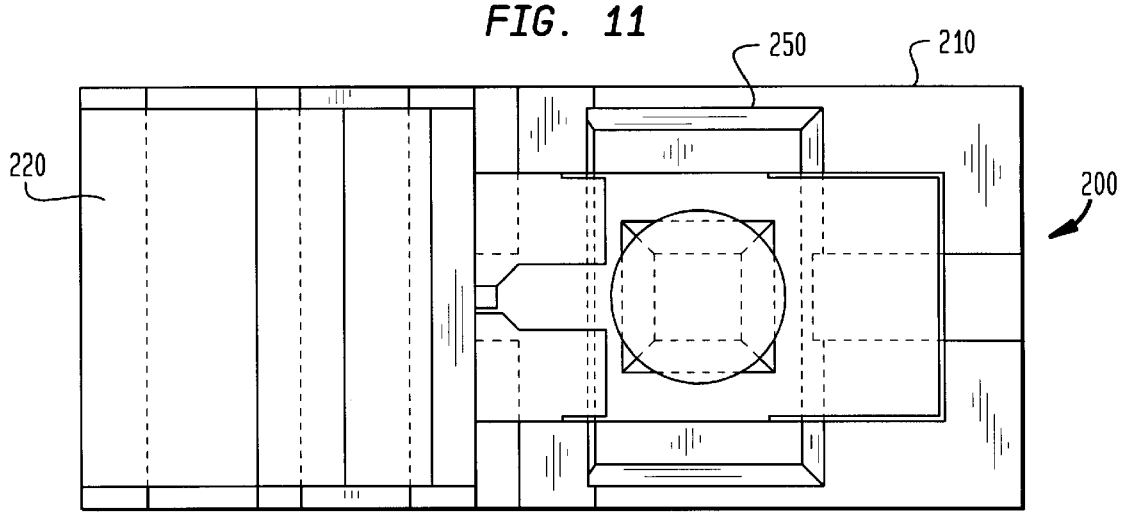
FIG. 11 is a top plan view illustrating a second embodiment of an optoelectronic module in accordance with the present invention.
Figure 12:
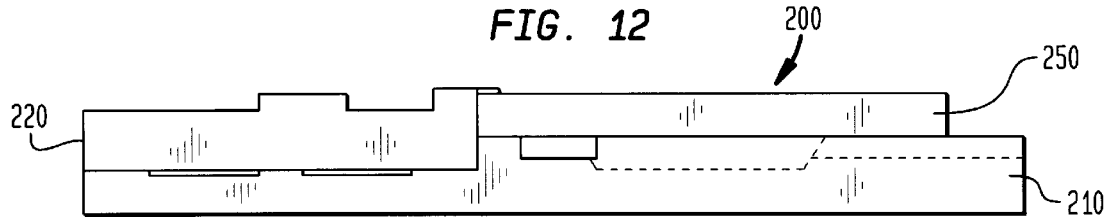
FIG. 12 is a front elevational view of the embodiment illustrated in FIG. 11.
Figure 13:
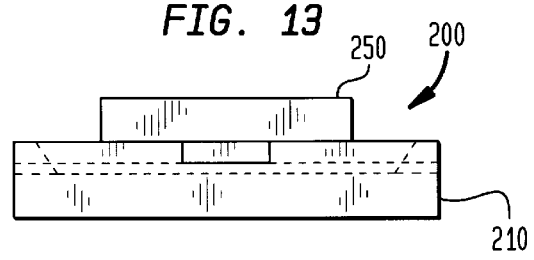
FIG. 13 is a side elevational view of the embodiment illustrated in FIG. 11.

Referring to FIGS. 1 and 7–10, the top surface 111 of the substrate 110 has a plurality of slots or trenches 112a, 112b and 112c formed therein for receiving a positioning member 160. The positioning member 160 is preferably of a generally wedge-shaped configuration having an inclined surface, as is shown in FIGS. 9 and 10. The positioning member may be made from any suitable material, such as metal, ceramic or silicon. The slots 112a, 112b and 112c may preferably be formed using a dicing saw to cut the slots into the substrate 110. A positioning member 160 is slidably received within each slot 112a, 112b and 112c and the header 150 is directly supported by the positioning members 160.

Thus, to fine tune angular, as well as x,y,z control of the header 150 relative the substrate 110 (and therefore of the optoelectronic device 130 relative the optical fiber 140 supported by base 120), small mechanical adjustments may be made by sliding one or more of the wedge-shaped positioning members 160 within their respective slots 112a, 112b and 112c. In this manner, an effector arm of a robot (not shown) may be utilized to push and/or pull each wedge-shaped member 160 towards or away from the lower surface 152 of the header 150, which lower surface 152 rests upon the inclined portion of the wedge-shaped positioning members 160. The optoelectronic device 130 may be energized during this process to ascertain when the desired alignment is achieved by detecting the amount of light passing from the optoelectronic device 130 into the optical fiber 140. Such optimal alignment may be determined by measuring the output of the fiber 140 during active alignment.

Figure 7:
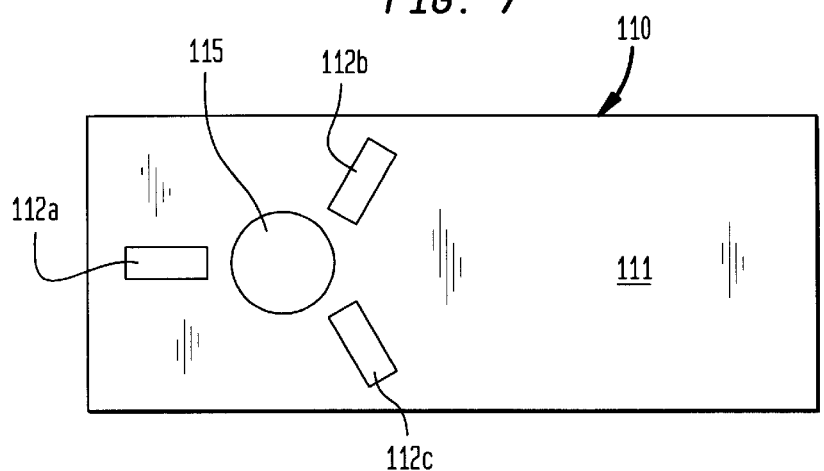
FIG. 7 is a top plan view of a substrate in accordance with the present invention.
Figure 8:
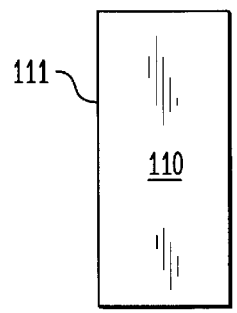
FIG. 8 is a side elevational view of the substrate illustrated in FIG. 7.

Once the optoelectonic device 130 is optically aligned with the optical fiber 140 via the incremental adjustments of the positioning members 160, the header 150 may be bonded to the substrate 110. To facilitate this bonding, a solder cavity or feeder hole 115 may be formed in the top surface 111 of the substrate 110, as is illustrated in FIG. 7. The solder cavity 115 may be formed by etching the top surface 111 of the substrate 110. A solder preform or paste may be inserted into the solder cavity 115, or if no solder cavity is provided, placed onto the top surface 111 of the substrate 110, to facilitate bonding of the header 150 to the substrate 110. A metalization layer may be provided on the lower surface 152 of the header 150 and on the top surface 111 of the substrate 110 to facilitate solder attachment of the header 150 to the substrate 110.

Once aligned, the solder preform or paste is thereafter reflowed to bond the aligned header 150 and wedge-shaped positioning members 160 to the substrate 110 using any of a number of conventional methods (e.g., high energy laser, infrared radiation, substrate heater, etc.). The header 150 may also include a cavity or through hole 155 extending through the header from the upper surface 151 to the lower surface 152, as is best illustrated in FIGS. 5 and 6. The cavity 155 may be formed by etching of the header 150. The cavity 155 may be utilized to facilitate such reflow of the solder. The cavity 155 also functions as a sprue to permit molten solder to fill a portion of the cavity 155 so that, when the molten solder is cooled, the solder flows back into the joint between the header 150 and the substrate 110, thereby reducing the stress in the soldered joint and providing greater reliability of the soldered joint. The assembled optoelectronic module 100 is then allowed to cool holding the aligned header 150 and wedge-shaped positioning members 160 in position on the substrate 110, thereby effecting permanent alignment of the optoelectronic device 130 to the optical fiber 140.

It should be understood that other configurations of the positioning member 160 may be utilized with the present invention. For instance, as an alternative to the wedge-shaped positioning member 160, a cone-shaped wedge may be utilized to adjust the positioning of the header 150 relative the substrate 110. In order to obtain course 15 displacement of the header 150 relative the substrate 110, the cone-shaped wedges are displaced within respective trenches 112a, 112b, 112c. The cone-shaped wedges comprise a cam-shaped circumference so that when the cone-shaped wedge is rotated relative the header 150 and substrate 110, the cam surface of the cone-shaped wedge provides fine displacement of the header 150 relative the substrate 110.

As yet another alternative to the wedge-shaped positioning member 160, the optoelectronic module 100 may be provided with glass or metallic spherical beads that may be received within dimples formed in the top surface 111 of the substrate 110. In order to align the optoelectronic device 130 to the optical fiber 140, a robotic manipulator may manipulate the header 150 upon which the optoelectronic device 130 is affixed until optimal alignment is achieved between the optoelectronic device 130 and the optical fiber 140. Such optimal alignment may be determined by measuring the output of the fiber 140 during active alignment. Once the optimal alignment is achieved, the distance between the lower surface 152 of the header 150 and the top surface 111 of the substrate 110 is measured at three spaced apart points using, for instance, a conventional capacitance technique, machine vision or optical measurement methods. Thereafter, the appropriate sized beads may be inserted between the header 150 and substrate 110 to support the header 150 in the desired position. Thereafter, the aligned header 150 may be bonded to the substrate 110.

Another embodiment of an optoelectronic module 200 in accordance with the present invention is illustrated in FIGS. 11–31. The optoelectronic module 200 comprises three basic parts: a first member or substrate 210, a second member or base 220, and a third member or header 250.

The first member or substrate 210 is the portion of the optoelectronic module 200 upon which the base 220 and header 250 are supported by and attached to. Once the optoelectronic device 230 and the optical fiber 240 have been fixed in place on the header 250 and base 220, respectively, and thereafter aligned with one another, the base 220 and header 250 will be affixed to the substrate 210.

The base 220 is a fiber submount upon which the optical fiber 240 is supported by and affixed to. The header 250 is a submount upon which the optoelectronic device 230 is supported by and affixed to. Typically, the optoelectronic device 230 is soldered to the header 250 and electrical connection to the optoelectronic device 230 is provided on the header 250.

A preferred material for the substrate 210, base 220 and header 250 is silicon, which may be in the form of wafers. Silicon wafers provide a number of advantages, including:

A large quantity of parts are relatively easy to manufacture.

Many variations of the parts may easily be made using one mask set, which provides greater flexibility for testing many variations on the assembly process.

Precision is relatively easy to maintain.

All parts have the same thermal expansion coefficient, reducing the complexity of final positioning when the parts are heated.

While silicon is the preferred material for manufacture of the optoelectronic module 200 in accordance with the present invention, it is understood that the substrate 210, base 220 and header 250 may be manufactured from a variety of other materials as well, such as aluminum nitride and various moldable or machinable plastics and ceramics.

Figure 15:
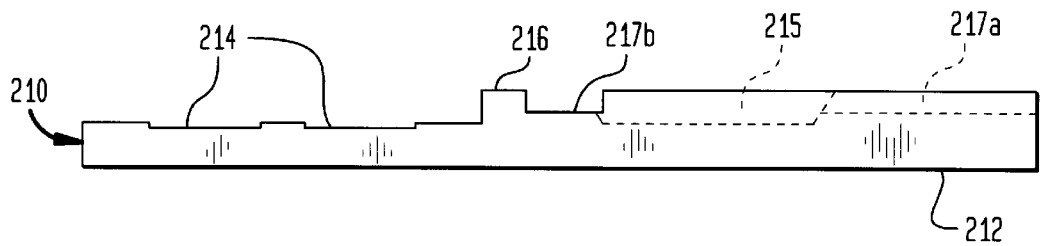
FIG. 15 is a front elevational view of the substrate illustrated in FIG. 14.
Figure 16:
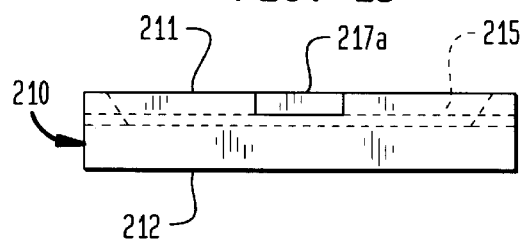
FIG. 16 is a side elevational view of the substrate illustrated in FIG. 14.

Referring to FIGS. 11–13, 27 and 31, the substrate 210 supports (either directly or indirectly) an optoelectronic device 230 and an optical fiber 240. As is shown in FIGS. 15–16, the substrate 210 has a top and a bottom surface 211 and 212, respectively, each of which are preferably substantially flat and planar. As mentioned above, the substrate 210 is preferably made from silicon, but may also be made from GaAs or from any other suitable material.

A pair of trenches 214 are formed in the top surface 211 of the substrate 210 into which adhesive may be deposited for fixing the base 220 to the substrate 210. The trenches 214 also provide free space for adhesive overflow after the base 220 is attached to the substrate 210. The trenches 214 may be formed on the substrate 210 in a conventional manner, such as by cutting the trenches 214 with a dicing saw.

A solder cavity 215 may also be formed in the top surface 211 of the substrate 210. A solder preform or paste may then be placed within the solder cavity 215 for attaching the header 250 to the substrate 210. A metalization layer 218 may be deposited within the solder cavity 215 using, for instance, a shadow mask, to assist the solder preform in wetting to the substrate 210 when the header 250 is attached to the substrate 210. The metalization layer 218 is preferably made from Ti-Pt-Au and may, for instance, be 1000 Angstroms Ti, 2000 Angstroms Pt and 5000 Angstroms Au. The solder cavity 215 is preferably formed in the top surface 211 of the substrate 210 by conventional etching processes.

The substrate 210 also includes an end stop 216 which is formed in the top surface 211 of the substrate 210. The end stop 216 serves to locate the base 220 on the substrate 210 prior to securing the base 220 to the substrate 210. Other fiducial features may also be provided on the substrate 210 and/or base 220 to facilitate proper location of the base 220 on the substrate 210.

Figure 14:
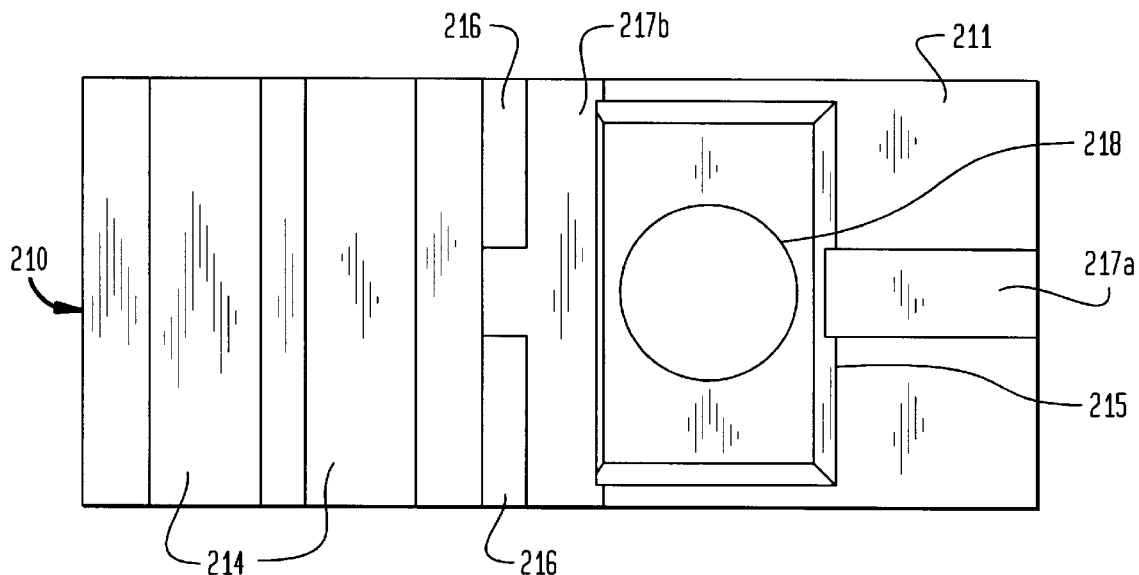
FIG. 14 is a top plan view of the substrate in accordance with the second embodiment illustrated in FIG. 11.

A pair of slots or trenches 217a, 217b are also formed in the top surface 211 of the substrate 210 for receiving a positioning member 160, which positioning member may be of a wedge-shaped configuration as illustrated in FIGS. 9–10. Referring to FIGS. 14–16, the trenches 217a, 217b are illustrated as being perpendicular to one another and may be formed using a dicing saw to cut the trenches 217a, 217b into the substrate 210. Preferably, a total of three wedge-shaped positioning members 160 are slidably received within the trenches 217a, 217b and the header 250 is directly supported by the positioning members 160. It is understood, however, that a different number of positioning members 160, such as for instance two positioning members, may be utilized in accordance with the invention.

Thus, to fine tune angular, as well as x,y,z control of the header 250 relative the substrate 210 (and therefore of the optoelectronic device 230 relative the optical fiber 240 supported by base 220), small mechanical adjustments may be made by sliding one or more of the wedge-shaped positioning members 160 within their respective trenches 217a, 217b. In this manner, an effector arm of a robot (not shown) may be utilized to push and/or pull each wedge-shaped positioning member 160 towards or away from the lower surface 252 of the header 250, which lower surface 252 rests upon the inclined portion of the wedge-shaped positioning members 160.

The substrate 210 may be manufactured in the following manner. Assuming a substrate 210 made from a 0.035 inch thick, 4 inch diameter silicon wafer, the solder cavity 215 may be etched using an appropriate etching mask within the top surface 211 of the substrate 210 to a depth of for instance 0.015 inches. After the solder cavity 215 is formed, a metalization layer 218 comprising for instance 1000 Angstroms Ti, 2000 Angstroms Pt and 5000 Angstroms Au may be deposited within the solder cavity 215 using an appropriate shadow mask.

Thereafter, a second metalization layer (not shown) may be deposited on the top surface 211 of the substrate 210 using an appropriate mask to provide dicing and milling marks for cutting out the wedge trenches 217a, 217b, end stop 216 and edges of the substrate 210. The second metalization layer may, for instance, be formed from titanium having a thickness of 1000 Angstroms. A dicing saw may then be aligned with the second metalization layer to cut the wedge trenches 217a, 217b and the end stop 216. The dicing saw may also be used to cut the adhesive trenches 214 in the substrate 210 and to dice the outer edge of the substrate 210 along the second metalization layer.

Figure 17:
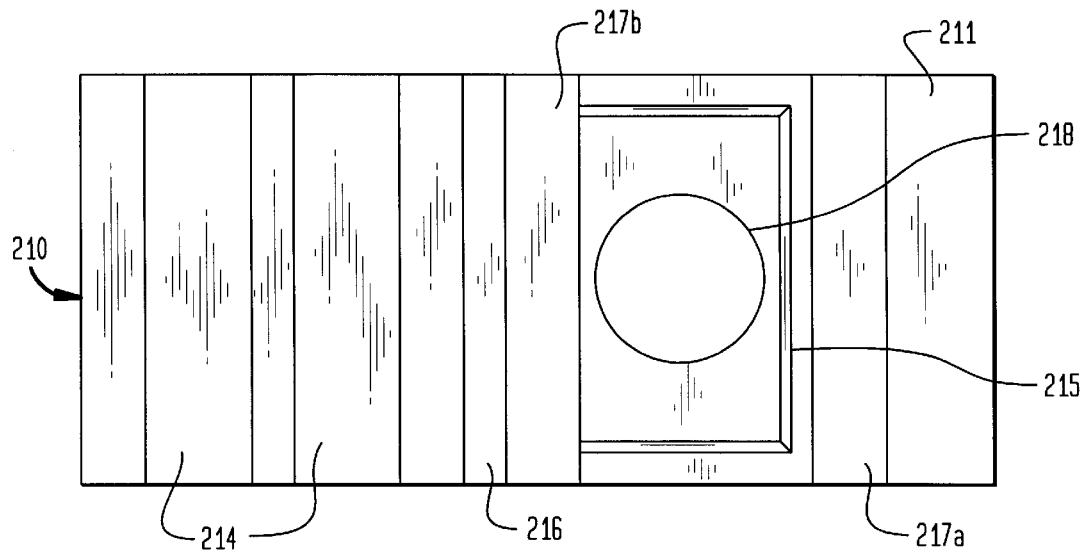
FIG. 17 is a top plan view of another substrate in accordance with the second embodiment illustrated in FIG. 11.
Figure 18:
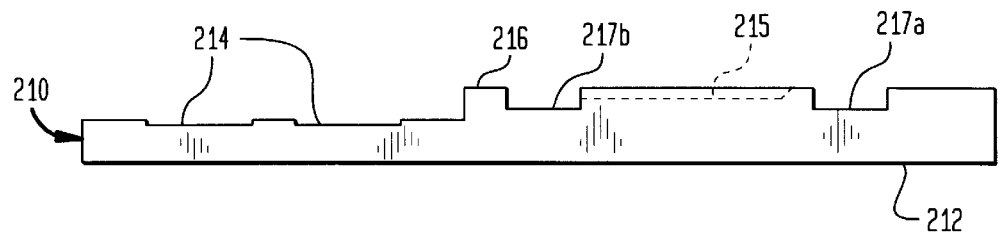
FIG. 18 is a front elevational view of the substrate illustrated in FIG. 17.
Figure 19:
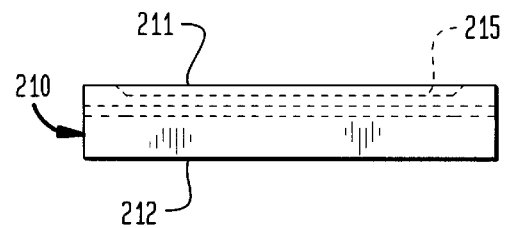
FIG. 19 is a side elevational view of the substrate illustrated in FIG. 17.

FIGS. 17–19 illustrate an alternative embodiment of the substrate 210 in which the solder cavity 215 formed in the top surface 211 of the substrate 210 is only 0.003 inches in depth and in which the wedge trenches 217a, 217b are parallel to one another. In this embodiment, the solder cavity 215 is etched into the top surface 211 of the substrate 210 using an appropriate etching mask. After the solder cavity 215 is formed, a metalization layer 218 comprising for instance 1000 Angstroms Ti, 2000 Angstroms Pt and 5000 Angstroms Au may be deposited within the solder cavity 215 using an appropriate shadow mask. A second metalization layer (not shown), preferably of titanium, is deposited on the top surface 211 of the substrate 210 to provide dicing marks for cutting the wedge trenches 217a, 217b and end stop 216. A dicing saw may then be aligned with the second metalization layer to cut the wedge trenches 217a, 217b and the end stop 216. The dicing saw may also be used to cut the adhesive trenches 214 in the substrate 210 and to dice the outer edge of the substrate 210 along the second metalization layer.

Figure 20:
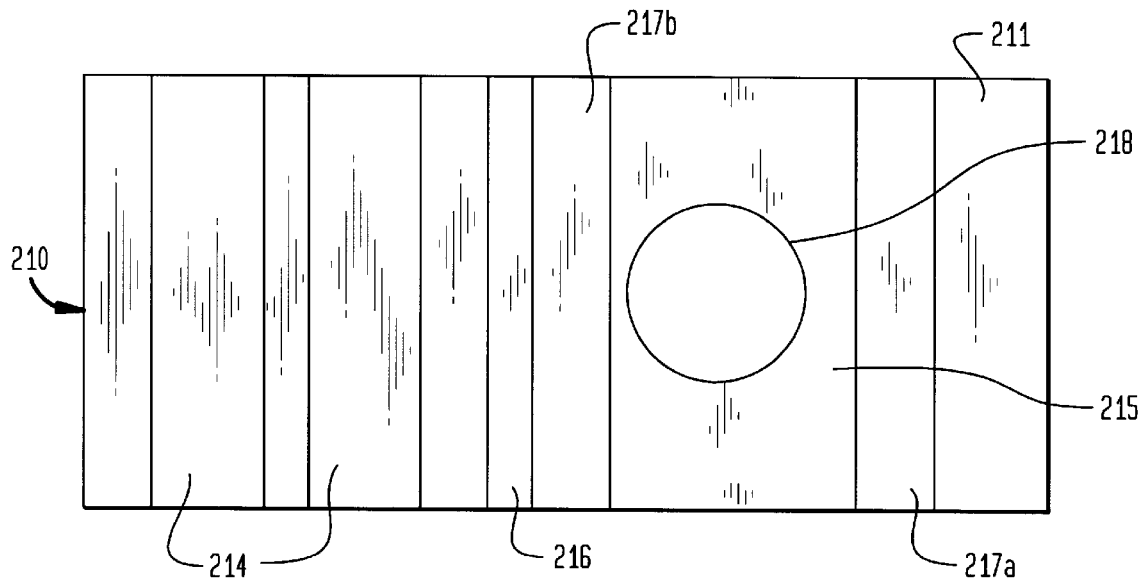
FIG. 20 is a top plan view of yet another substrate in accordance with the second embodiment illustrated in FIG. 11.
Figure 21:
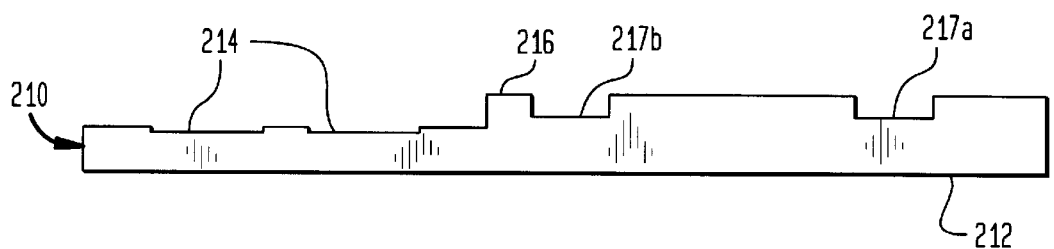
FIG. 21 is a front elevational view of the substrate illustrated in FIG. 20.
Figure 22:
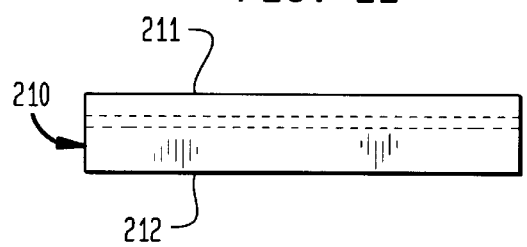
FIG. 22 is a side elevational view of the substrate illustrated in FIG. 20.
Figure 23:
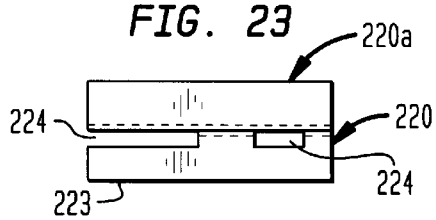
FIG. 23 is a side elevational view of a base and cover in accordance with the second embodiment illustrated in FIG. 11.
Figure 24:
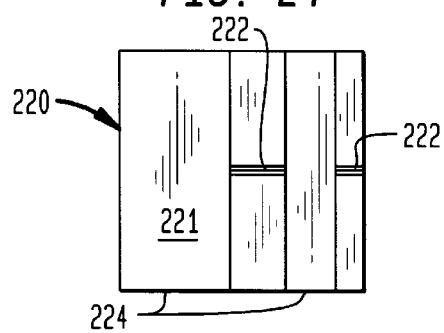
FIG. 24 is a top plan view of the base illustrated in FIG. 23.
Figure 25:
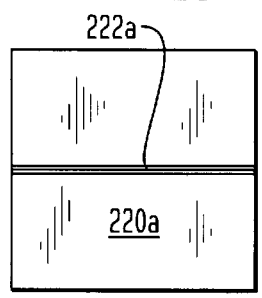
FIG. 25 is a top plan view of the cover illustrated in FIG. 23.
Figure 26:
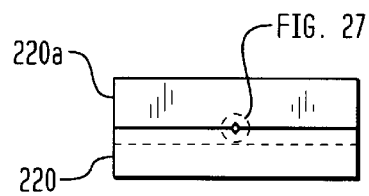
FIG. 26 is an end elevational view of the base and cover illustrated in FIG. 23.
Figure 27:
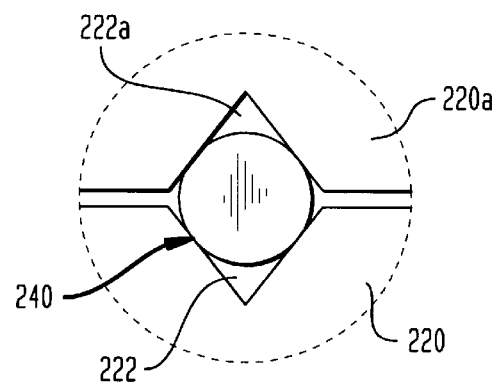
FIG. 27 is an enlarged view of the optical fiber positioned between the base and cover of FIG. 26.
Figure 28:
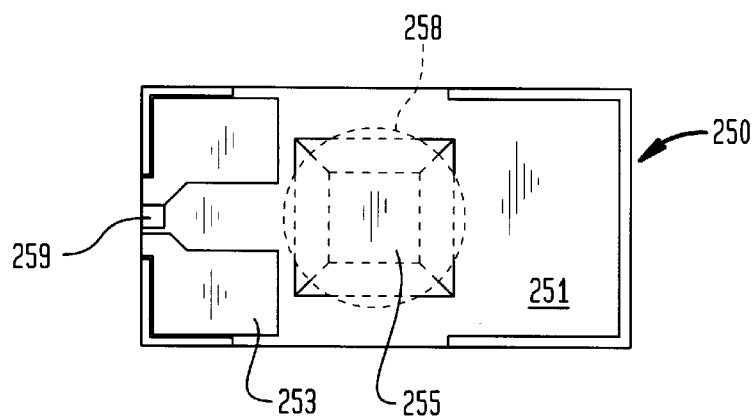
FIG. 28 is a top plan view of a header in accordance with the second embodiment illustrated in FIG. 11.
Figure 29:
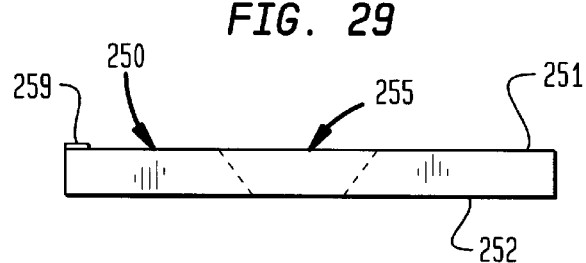
FIG. 29 is a side elevational view of the header illustrated in FIG. 28.

FIGS. 20–22 illustrate yet another alternative embodiment of the substrate 210 having no solder cavity 215 formed in the top surface 211 of the substrate 210 and in which the wedge trenches 217a, 217b are parallel to one another. In this embodiment, a metalization layer 218 comprising for instance 1000 Angstroms Ti, 2000 Angstroms Pt and 5000 Angstroms Au may be deposited on the top surface 211 of the substrate 210 using an appropriate shadow mask. A second metalization layer, preferably of titanium, is deposited on the top surface 211 of the substrate 210 to provide dicing marks for cutting the wedge trenches 217a, 217b and end stop 216. A dicing saw may then be aligned with the second metalization layer to cut the wedge trenches 217a, 217b and the end stop 216. The dicing saw may also be used to cut the adhesive trenches 214 in the substrate 210 and to dice the outer edge of the substrate 210 along the second metalization layer.

With reference to FIGS. 23–27, the optoelectronic module 200 also comprises a second member or base 220 for supporting an optical fiber 240 within a longitudinally extending groove 222 formed in the base 220. Preferably, the base 220 includes an upper surface 221 and a lower surface 223, both surfaces being substantially flat and planar. The base 220 is supported by and extends upwardly from a portion of the top surface 211 of the substrate 210 so that the upper surface 221 of the base 220 is elevated above the top surface 211 of the substrate 210. The base 220 is preferably made from the same material as the substrate 210 (e.g., silicon or GaAs) and may either be integrally formed as part of the substrate 210 or as a separate element that is joined to the substrate 210 in a conventional manner (e.g., bonded, fastened, etc.).

A longitudinally extending groove 222 is formed in the top surface 221 of the base 220 for locating and supporting the optical fiber 240. The groove 222 is preferably of a generally V-shaped configuration and is of sufficient dimension to precisely locate and support the optical fiber 240. Alternatively, the groove 222 may be of any other suitable configuration to locate the fiber 240, such as for instance, a generally U-shaped configuration. Preferably, the groove 222 may be formed in the base 220 by photomasking and etching the groove within the base material.

The base 220 also includes trenches 224 which retain adhesive used to bond the optical fiber 240 to the base 220. The adhesive trenches 224 may be formed in the base 220 in a conventional manner.

Once the optical fiber 240 is positioned within the groove 222 of base 220, the fiber 240 is bonded within the groove 222 of the base 220 using any suitable adhesive (e.g., a high temperature ceramic adhesive) that is capable of bonding to the base material and that will withstand temperatures above 200° C.—the temperature required to reflow a solder preform used to bond the header 250 to the substrate 210. Alternatively, if the fiber 240 is metalized, the fiber 240 may be joined to the base 240 by soldering or welding the metalized fiber 240 within the groove 222.

In addition, a fourth member or cover 220a, which is preferably identical to the base 220 (except for the omission of the trenches 224), may optionally be positioned over and affixed or bonded to the base 220 in order to further retain and protect the fiber 240. Like the base 220, the cover 220a includes a longitudinally extending groove 222a for locating and retaining the fiber 240, which groove 222a is preferably of a generally V-shaped configuration and is of sufficient dimension to precisely locate and retain the optical fiber 240. Preferably, the groove 222a may be formed in the cover 220a by etching the groove within the cover material. Like the substrate 210 described above, the base 220 and cover 220a may each be manufactured from a 0.035 inch thick, 4 inch diameter silicon wafer. After attachment of the optical fiber 240 to the base 220 and/or cover 220a, the end of the fiber 240 and the base/cover facet are preferably polished to provide a relatively flat surface for alignment and to aid in optical light transmission.

Referring to FIGS. 28–31, the optoelectronic module 200 also comprises a third member or header 250 for supporting the optoelectronic device 230 (e.g., semiconductor laser, LED or photodiode). The header 250 preferably includes an upper surface 251 and a lower surface 252, each of which is substantially flat and planar.

Like the base 220, the header 250 is also supported by (directly or indirectly) and extends upwardly from the top surface 211 of the substrate 210 so that the upper surface 251 of the header 250 is elevated above the top surface 211 of the substrate 210. The optoelectronic device 230 is located on and supported by the upper surface 251 of the header 250 in a position in close proximity to the optical fiber 240 supported by the base 220.

The header 250 is preferably made from the same material as the substrate 210. For instance, the header 250 may be manufactured from a 0.020 inch thick, 4 inch diameter silicon wafer in which metalization layers are provided for electrical contact to the optoelectronic device 230 and for dicing marks.

The header 250 may optionally include a cavity or through hole 255 extending through the header from the upper surface 251 to the lower surface 252. The cavity 255 is used to facilitate heating of the solder preform (e.g., via a high energy laser) to attach the header 250 to the substrate 210. The cavity 255 may be formed using a suitable mask to etch the cavity 255 through the header 250 and the cavity 255 may for instance range from 0.5 mm to 1 mm.

A first metalization layer 253 (e.g., 1000 Angstroms Ti, 2000 Angstroms Pt and 5000 Angstroms Au) may be applied to the upper surface 251 of the header 250 to facilitate bonding and electrically connecting the optoelectronic device 230 to the header 250. The optoelectronic device 230 may be bonded to the header 250 in a conventional manner (e.g., soldering) and electrical connections to the optoelectronic device 230 may also be made in a conventional manner (e.g., solder and wire bonding). For example, the optoelectronic device 230 is preferably soldered to the header 250 using a suitable layer of solder 259 (e.g., a 0.003 inch layer of deposited AuSn solder) which is deposited on the upper surface 251 of the header 250 using a suitable solder mask. The N-side electrical contact of the optoelectronic device 230 may be made through the solder joint by reflowing the solder layer 259 at a suitable temperature (e.g., 325° C.). The P-side electrical contact of optoelectronic device 230 may be made via wire bond to the remaining metalization layer 253.

The first metalization layer 253 may also serve to provide dicing guide marks on the upper surface 251 of the header 250 in order to dice the header 250 by aligning a dicing saw with the outer edge of the dicing marks.

Figure 30:
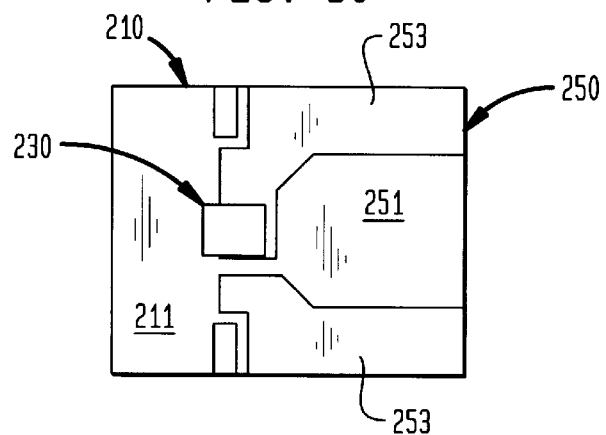
FIG. 30 is a partial top plan view of the header illustrated in FIG. 28 showing the optoelectronic device positioned on the header.
Figure 31:
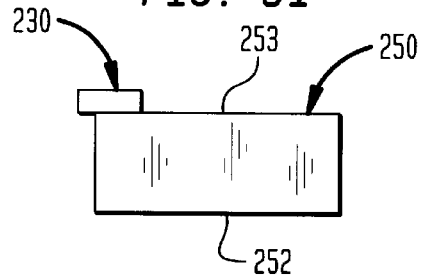
FIG. 31 is a partial side elevational view of the header illustrated in FIG. 28 showing the optoelectronic device positioned on the header.

The optoelectronic device 230 is preferably positioned on the top surface 251 of the header 250 laterally centered (X) and overhanging the front edge of the header 250 in order to provide yaw angular position correction of the optoelectronic device 230 with respect to the optical fiber 240, as is illustrated in FIGS. 30–31. For instance, the optoelectronic device 230 may overhang the front edge of the header 250 by 0.002 inch. In addition to the optoelectronic device 230, other electronic devices may also be positioned on the header 250 (e.g., thermo-electronic cooler, light detector, etc.).

A second metalization layer 258 is deposited on the lower surface 252 of the header 250 using, for instance, a shadow mask, to assist the solder preform positioned within the solder cavity 215 of the substrate 210 in wetting to the header 250 when the header 250 is attached to the substrate 210. The metalization layer 258 is preferably made from Ti-Pt-Au and may, for instance, comprise 1000 Angstroms Ti, 2000 Angstroms Pt and 5000 Angstroms Au.

A preferred wedge-shaped positioning member 160 for supporting the header 250 on the substrate 210 is illustrated in FIGS. 9 and 10. One or more positioning members 160 are slidingly positioned within each of the slots or trenches 217a, 217b formed in the substrate 210. The header 250 is directly supported by the positioning members 160. Preferably, a total of three positioning members 160 are utilized to position and support the header 250, but a greater or lesser number of positioning members 160 may be utilized in accordance with the present invention.

Thus, to fine tune angular, as well as x,y,z control of the header 250 relative the substrate 210 (and therefore of the optoelectronic device 230 relative the optical fiber 240 supported by base 220), small mechanical adjustments may be made by sliding one or more of the positioning members 160 within their respective slots 117a, 117b. In this manner, an effector arm of a robot (not shown) may be utilized to push and/or pull each positioning member 160 towards or away from the lower surface 252 of the header 250, which lower surface 252 rests for instance upon the inclined portion of the wedge-shaped positioning members 160.

To assemble the optoelectronic module 200, the optical fiber 240 is bonded within the groove 222 in the base 220 and the cover 220a is optionally secured to the base 220. The base 220 is then positioned on the substrate 210 by butting the polished facet of the base 220 against the end stop 216 formed on the substrate 210. Other fiducial features formed on the substrate 210 and a robotic vision system may be utilized to position the base 220 on the substrate 210. The base 220 is then bonded in position to the substrate 210 using an adhesive (e.g., a high temperature ceramic adhesive) located within the trenches 214. A minimal amount of adhesive capable of bonding the base 220 to the substrate 210 is preferred because excessive adhesive will cause the base 220 to rise beyond the adjustment range of the header/optoelectronic device.

Solder preform or paste is thereafter positioned within the solder cavity 215 or on the top surface 211 of the substrate 210 depending upon which embodiment of the substrate 210 is being utilized. The header 250 with the optoelectronic device 230 attached thereto is then positioned on the substrate 210 in close proximity to the end of the optical fiber 240. Such positioning may be accomplished using a robotic positioner.

The optoelectronic device 230 is then energized, for instance using probes in the gripper of the robotic positioner to contact the metal pads on the header 250. Assuming for instance that the optoelectronic device 230 is a laser, the light intensity at the end of the optical fiber 240 is measured using a detector and the header 250 is moved by the robotic positioner or manipulator until the light output from the fiber 240 (i.e., power at the detector) is maximized. The positioning members 160 are then slid into their respective trenches 217a, 217b formed on the substrate 210 until contact is made between the inclined surface of the wedge shaped positioning member 160 and the lower surface 252 of the header 250.

Alternatively, the header 250 may be positioned on the positioning members 160 and the positioning members may thereafter be adjusted within their respective trenches 217a, 217b to fine tune angular, as well as x,y,z control of the header 250 relative the substrate 210 (and therefore of the optoelectronic device 230 relative the optical fiber 240 supported by base 220). In this manner, an effector arm of a robot (not shown) may be utilized to push and/or pull each positioning member 160 towards or away from the lower surface 252 of the header 250, which lower surface 252 rests upon the inclined portion of the wedge-shaped positioning members 160.

Irrespective of which alignment method is used, once aligned, the solder preform or paste is thereafter reflowed to bond the aligned header 250 and positioning members 160 to the substrate 210 using any of a number of conventional methods (e.g., high energy laser, infrared radiation, substrate heater, etc.). The cavity 255 may be utilized to facilitate such reflow of the solder. The metalization layers 218, 258 deposited on the substrate 210 and header 250, respectively, facilitate solder attachment of the aligned header 250 to the substrate 210. The cavity 255 also functions as a sprue to permit solder to fill a portion of the cavity 255 so that, when the solder is cooled, the solder flows back into the joint between the header 250 and the substrate 210, thereby reducing the stress in the soldered joint and providing greater reliability of the soldered joint. The assembled optoelectronic module 200 is then allowed to cool holding the aligned header 250 and positioning members 160 in position on the substrate 210, thereby effecting permanent optical alignment of the optoelectronic device 230 to the optical fiber 240.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. An optoelctronic module having an optoelectronic device optically aligned with an optical fiber, the optoelectronic module comprising:

a first member having a top major surface;

a second member for supporting the optical fiber and having top and bottom major surfaces, the bottom surface thereof being fixed to the top surface of the first member, the second member including a longitudinal groove formed along the top major surface of the second member for receiving an end of the optical fiber in a fixed position aligned with a predetermined axis;

a plurality of positioning members supported on the top surface of the first member;

a third member having top and bottom major surfaces for mounting the optoelectronic device on the top major surface thereof in aligned relation with the axis, the third member being supported by the positioning members to maintain the aligned relation of the optoelectronic device with the axis and the third member being fixed to the top surface of the first member.

2. The optoelectronic module according to claim 1, further comprising a solder cavity formed within the top surface of the first member for receiving a solder preform used to bond the third member to the first member.

3. The optoelectronic module according to claim 2, wherein a first metalization layer is disposed on the top surface of the first member and a second metalization layer is disposed on the bottom surface of the third member to facilitate bonding of the third member to the first member.

4. The optoelectronic device according to claim 3, wherein the first and second metalization layers comprise titanium, platinum and gold.

5. The optoelectronic module according to claim 2, further comprising a cavity formed through the third member through which the solder preform may be heated to reflow the solder.

6. The optoelectronic module according to claim 2, wherein the solder preform comprises a tin-gold combination.

7. The optoelectronic module according to claim 1, wherein the positioning members are generally of wedge-shaped configuration.

8. The optoelectronic module according to claim 7, wherein a plurality of trenches are formed in the top surface of the first member for receiving the positioning members.

9. The optoelectronic module according to claim 8, wherein at least two of the trenches are parallel to each other.

10. The optoelectronic module according to claim 8, wherein at least two of the trenches are perpendicular to one another.

11. The optoelectronic module according to claim 1, wherein the second member is bonded to the top surface of the first member.

12. The optoelectronic module according to claim 11, wherein at least one adhesive trench is formed within the top surface of the first member for receiving adhesive to bond the second member to the first member.

13. The optoelectronic module according to claim 12, wherein the adhesive is a high temperature adhesive.

14. The optoelectronic module according to claim 1, wherein the optical fiber is bonded to the second member.

15. The optoelctronic module according to claim 14, wherein at least one adhesive trench is formed within the top surface of the second member for receiving an adhesive used to bond the optical fiber to the second member.

16. The optoelectronic module according to claim 14, wherein the optical fiber is bonded to the second member using a high temperature adhesive.

17. The optoelectronic module according to claim 1, wherein the first, second and third members are made from the same material.

18. The optoelectronic module according to claim 17, wherein the first, second and third members are made from silicon.

19. The optoelectronic module according to claim 1, wherein a metalization layer is disposed on the top surface of the third member for establishing electrical contact to the optoelectronic device.

20. The optoelectronic module according to claim 19, wherein the metalization layer comprises titanium, platinum and gold.

21. The optoelectronic module according to claim 1, wherein, prior to affixing the third member to the first member, the positioning members are incrementally adjustable relative the first and third members to align the optoelectronic device with the axis.

22. The optoelectronic module according to claim 1, wherein an end stop is formed on the top surface of the first member for positioning the second member on the top surface of the first member.

23. The optoelectronic module according to claim 1, wherein the second member is formed integrally with the first member.

24. The optoelectronic module according to claim 1, wherein the longitudinally extending groove formed in the second member is of a generally V-shaped configuration.

25. The optoelectronic module according to claim 1, further comprising a fourth member disposed to cover at least a portion of the top surface of the second member supporting the optical fiber, the fourth member having a longitudinally extending groove formed within a bottom major surface thereof for receiving the optical fiber, and the bottom surface of the fourth member being supported by and fixed to the top surface of the second member.

26. A method of optically aligning an optoelectronic device to an optical fiber, the method comprising the steps of:

(a) providing a substrate;

(b) positioning an end of the optical fiber in a fixed position relative a top surface of the substrate;

(c) mounting the optoelectronic device on a top surface of a header;

(d) positioning a plurality of positioning members on the top surface of the substrate for supporting the header;

(e) energizing the optoelectronic device and detecting light passing through the optical fiber; and (f) incrementally adjusting one or more of the positioning members until the light detected through the optical fiber is maximized.

27. The method according to claim 26, wherein the step of positioning the optical fiber comprises the steps of:

positioning the optical fiber within a longitudinally extending groove formed within a top surface of a base;

positioning the base against an end stop formed in the top surface of the substrate; and affixing the base to the top surface of the substrate.

28. The method according to claim 27, further comprising the steps of bonding the optical fiber to the base and bonding the base to the substrate.

29. The method according to claim 28, wherein the optical fiber is bonded to the base and the base is bonded to the substrate using a high temperature adhesive.

30. The method according to claim 27, further comprising the step of positioning a cover over the top surface of the base supporting the optical fiber, the cover having a longitudinally extending groove formed within a bottom major surface thereof for receiving the optical fiber, and the bottom surface of the cover being supported by and fixed to the top surface of the base.

31. The method according to claim 26, further comprising the steps of:

depositing a first metalization layer on the top surface of the substrate;

disposing solder over the first metalization layer;

depositing a second metalization layer on a bottom surface of the header; and heating, melting and thereafter cooling the solder to bond the header to the substrate after the detected light is maximized.

32. The method according to claim 31, further comprising the step of providing a cavity through the header to facilitate heating of the solder.

33. The method according to claim 31, further comprising the step of providing a solder cavity in the top surface of the substrate for receiving the first metalization layer and the solder.

34. The method according to claim 26, further comprising the step of bonding the header to the substrate after the light detected through the optical fiber is maximized.

35. The method according to claim 26, further comprising the step of depositing a metalization layer on the top surface of the header for establishing electrical contact to the optoelectronic device.

36. The method according to claim 26, wherein the positioning members are generally of wedge-shaped configuration.

37. The method according to claim 26, further comprising the step of providing a plurality of trenches in the top surface of the substrate in which the positioning members are received and adapted to be incrementally adjusted.

38. An optoelectronic module having at least one optoelectronic device optically aligned with at least one optical fiber, the optoelectronic module comprising:

a substrate having a top major surface;

means for supporting an end of at least one optical fiber in a fixed position relative the top surface of the substrate with the end being in coaxial relation with an axis;

a header having top and bottom major surfaces for mounting at least one optoelectronic device on the top major surface thereof; and means for adjusting the header relative the top surface of the substrate to actively align the at least one optoelectronic device with the axis.

39. The optoelectronic module according to claim 38, further comprising a solder cavity formed within the top surface of the substrate for receiving a solder preform used to bond the header to the substrate.

40. The optoelectronic module according to claim 39, wherein a first metalization layer is disposed on the top surface of the substrate and a second metalization layer is disposed on the bottom surface of the header to facilitate bonding of the header to the substrate.

41. The optoelectronic module according to claim 39, further comprising a cavity formed through the header through which the solder preform may be heated to reflow the solder.

42. The optoelectronic module according to claim 38, wherein the adjusting means comprise a plurality of generally of wedge-shaped members.

43. The optoelectronic module according to claim 38, wherein a metalization layer is disposed on the top surface of the header for establishing electrical contact to at least one optoelectronic device.

44. An optoelectronic module having at least one optoelectronic device optically aligned with at least one optical fiber, the optoelectronic module comprising:

a substrate having a top major surface;

means for supporting an end of at least one optical fiber in a fixed position relative the top surface of the substrate with the end being in coaxial relation with an axis;

a header having top and bottom major surfaces for mounting at least one optoelectronic device on the top major surface thereof; and means for positioning the header relative the top surface of the substrate to align the at least one optoelectronic device with the axis, wherein the means for supporting the optical fiber comprise a base having top and bottom major surfaces, the bottom surface thereof being fixed to the top surface of the substrate, the base comprising a longitudinally extending V-shaped groove formed along the top major surface thereof for receiving an end of at least one optical fiber.

45. The optoelectronic module according to claim 44, wherein at least one adhesive trench is formed within the top surface of the substrate for receiving adhesive to bond the base to the substrate.

46. The optoelectronic module according to claim 44, wherein the optical fiber is bonded to the base.

47. The optoelectronic module according to claim 44, further comprising a cover member disposed to cover at least a portion of the top surface of the base supporting the optical fiber, the cover member having a longitudinally extending V-shaped groove formed within a bottom major surface thereof for receiving the optical fiber, and the bottom surface of the cover member being supported by and fixed to the top surface of the base.

48. The optoelectronic module according to claim 44, wherein an end stop is formed on the top surface of the substrate for locating the base on the top surface of the substrate and wherein the base is bonded to the top surface of the substrate.

* * * * *